F. H. WEAVER.
SEWER PIPE SECTION.
APPLICATION FILED OCT. 6, 1914. RENEWED SEPT. 22, 1915.
1,180,459.  Patented Apr. 25, 1916.
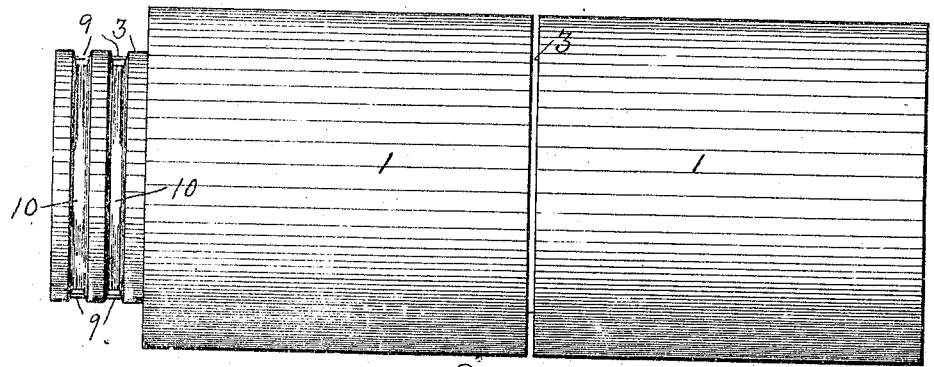
Fig. 1
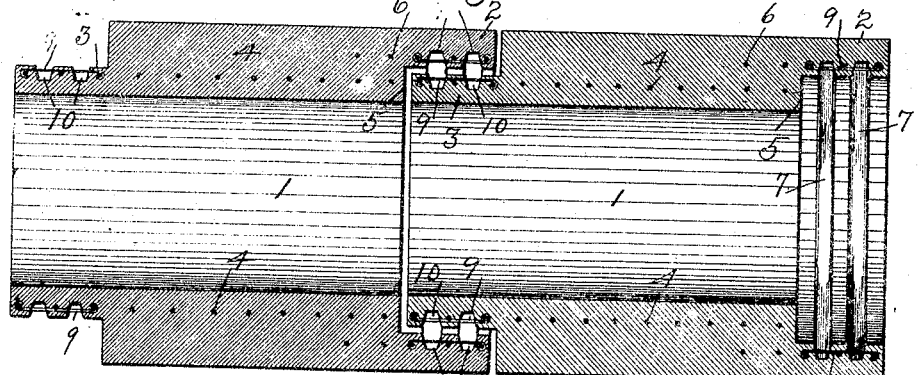
Fig. 2.
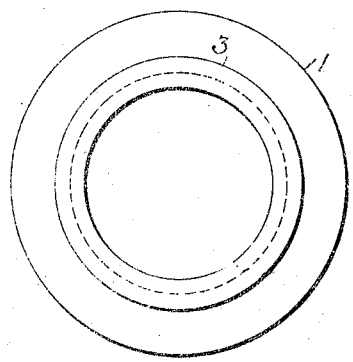
Fig. 3.
Fig. 4.
Witnesses:
J. L. Sarbach
Maude M. Amoss
Inventor
Frederick H. Weaver
By Chapin & Ferguson
Attorney

UNITED STATES PATENT OFFICE.

FREDERICK H. WEAVER, OF BALTIMORE, MARYLAND.

SEWER-PIPE SECTION.

1,180,459.

Specification of Letters Patent.   Patented Apr. 25, 1916.

Application filed October 6, 1914, Serial No. 865,251. Renewed September 22, 1915. Serial No. 52,106.

*To all whom it may concern:*

Be it known that I, FREDERICK H. WEAVER, a citizen of the United States, residing at Baltimore, in the State of Maryland, have invented certain new and useful Improvements in Sewer-Pipe Sections, of which the following is a specification.

This invention relates to improvements in reinforced concrete sewer pipe sections for use in constructing sewers, or other conduits, and has for its object to provide a section so constructed that when two or more sections are joined together their inner and outer surfaces will be flush, and further to provide a sealed reinforced joint between the sections when assembled.

The invention consists of the novel construction and arrangement of the parts and combination of parts hereinafter more fully set forth in the following specification and pointed out in detail in the appended claims.

In the accompanying drawings,—Figure 1 is a side elevation of two sections assembled and embodying my invention. Fig. 2 is a vertical longitudinal section of Fig. 1. Fig. 3 is an end view of Fig. 1. Fig. 4 is a detail view, on an enlarged scale, of one of the reinforcing tie bars which project across the grooves in the ends of the sections.

Referring to the accompanying drawings, forming part of this specification, and in which like reference numerals designate like parts throughout the several views thereof, 1 designates a pipe, or section, having a bell end 2 and a spigot end 3. The pipe, or section, is provided with reinforcing material 4 extending entirely around the body thereof from the shoulder 5 of the bell end to the outer end of the spigot end, and a short piece of reinforcing material 6 extending from the outer end of the bell end back beyond the shoulder 5. The bell end 2 is provided with two annular grooves 7 in the inner surface thereof, and a number of short reinforcing bars 9 with their ends bent over and secured to the reinforcing material 6 and project across both of said grooves 7 below the inner surface of the bell end. The spigot end 3 is provided with two annular grooves 10 in the outer surface thereof which coincide with the grooves 7 when the sections are fitted together. The spigot end 3 is also provided with a number of short reinforcing bars 9 which have their ends secured to the reinforcing material 4 and project across both said grooves 10 below the outer surface of said spigot end. When the pipes, or sections, are fitted together a piece may be broken off the bell end large enough to permit of the cement, concrete or other filling material being poured into the grooves 7 and 10 until the latter are filled, as well as the portion broken off the bell end, whereby said concrete, cement, or other material, will take around said bars 9 and a reinforced locked and sealed joint will be formed between the pipes or sections when assembled.

The bars 9 not only serve as a locking means when the joints are filled, but also serve to strengthen the said spigot and bell ends of said pipes or sections.

Having fully described my invention, what I claim is:

1. A pipe, or section, having a bell end provided with two annular grooves in its inner surface, a number of bars projecting across said two annular grooves below the inner surface of said bell end, a spigot end having two annular grooves in its outer surface which coincide with the annular grooves in the bell end when the pipes, or sections, are fitted together, and a number of short bars projecting across said two annular grooves in the spigot end below the outer surface of said spigot end.

2. A pipe, or section, having a bell end provided with two annular grooves in its inner surface, a spigot end having two annular grooves in its outer surface adapted to coincide with the grooves in the bell end when the sections are fitted together, a piece of reinforcing material extending around said pipe, or section, short bars extending across said grooves in the bell end and secured to said reinforcing material, and short bars extending across the grooves in the spigot end and secured to said reinforcing material.

3. A pipe, or section, having a bell end provided with two annular grooves in its inner surface, a spigot end having two annular grooves in its outer surface adapted to coincide with the grooves in the bell end when the sections are fitted together, a piece of reinforcing material extending around said pipe, or section, short bars extending across said grooves in the bell end below the inner surface thereof and having their ends secured to said reinforcing material, and short bars extending across the grooves in the spigot end below the outer surface thereof and having their outer ends secured to said reinforcing material.

In testimony whereof I affix my signature in presence of two witnesses.

FREDERICK H. WEAVER.

Witnesses:
CHAPIN A. FERGUSON,
MAUDE M. AMOSS.